FIG. I

INVENTORS
ALBERT BOUTELLE
HOWARD R. REED

April 4, 1967  A. BOUTELLE ETAL  3,312,496
UNDERWATER MANIPULATOR

Filed Sept. 14, 1965  3 Sheets-Sheet 2

INVENTORS
ALBERT BOUTELLE
HOWARD R. REED
BY
ATTORNEY 3,312,496
UNDERWATER MANIPULATOR
Albert Boutelle, P.O. Box 266, Warren, R.I. 02885, and
Howard R. Reed, 213 Warren Ave., East Providence,
R.I. 02914
Filed Sept. 14, 1965, Ser. No. 487,276
8 Claims. (Cl. 294—66)

The present invention relates to improvements in manipulators and more particularly to an improved mechanical manipulator for underwater use.

An object of the present invention is to provide an improved underwater manipulator wherein two cooperative jaws are provided and can be manipulated through a wide range of movements.

Another object of the present invention is to provide an improved underwater manipulator wherein a pair of cooperative jaws can be moved in preselected relation to each other and held in any rotational position throughout 360° in either direction.

Still another object of the present invention is to provide an improved underwater manipulator wherein a pair of jaws are suported with their clamping faces in parallel relation and the parallelism of the jaws is maintained throughout clamping and rotating movement thereof.

A still further object of the present invention is to provide an improved underwater manipulator according to the preceding object wherein the jaws are positively relatively moved in either direction by means having substantial power in relation to the size of the arm supporting the jaws.

A further object of the present invention is to provide an improved underwater manipulator wherein the power means for effecting the clamping and unclamping movement of the jaws includes a power cylinder the housing of which constitutes the supporting arm for the jaws.

Various other objects and advantages will become apparent from the detailed description to follow.

Figure 1:
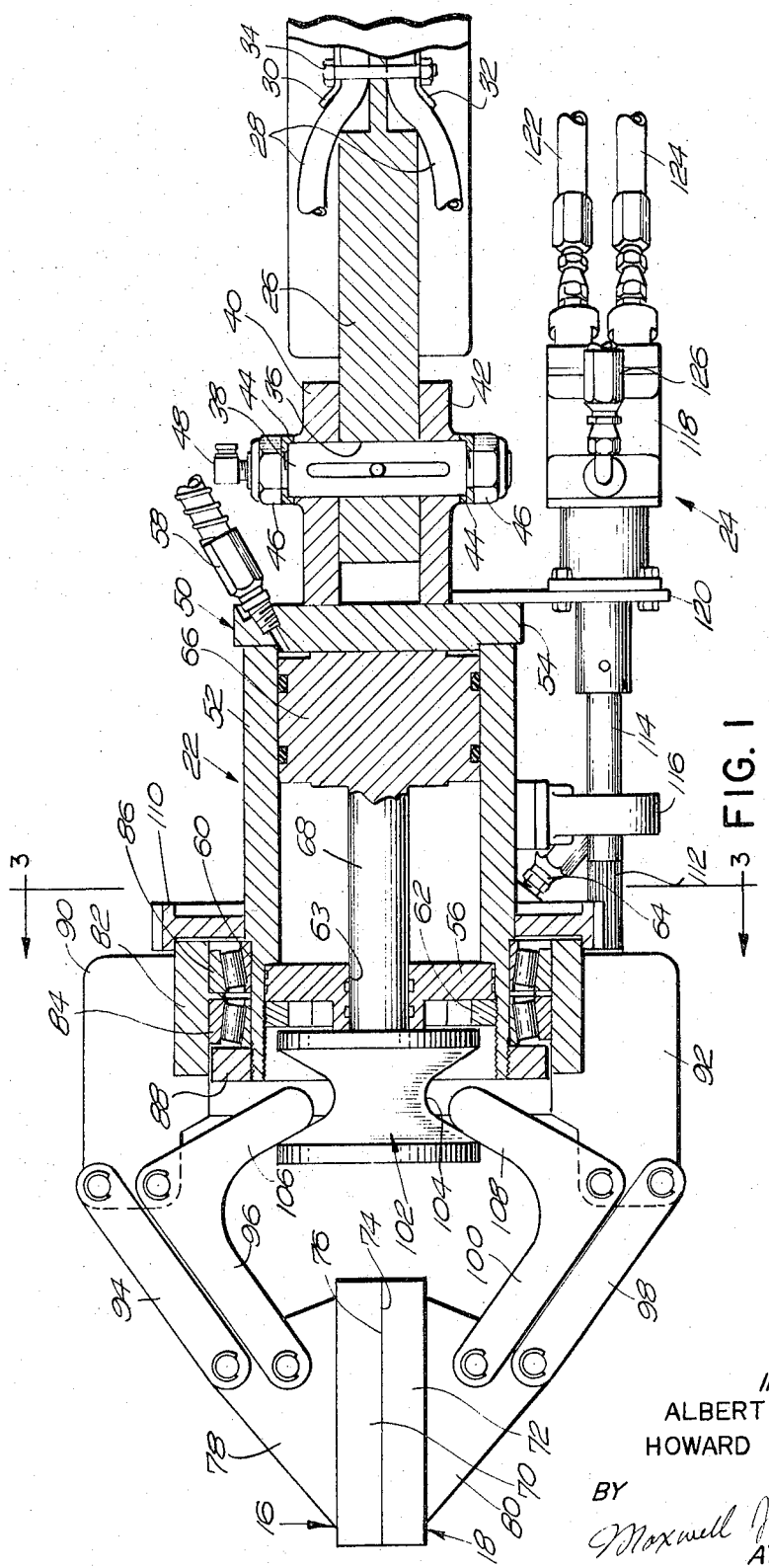
FIGURE 1 is a side elevational view of the underwater manipulator according to the present invention, part being in section.
Figure 2:
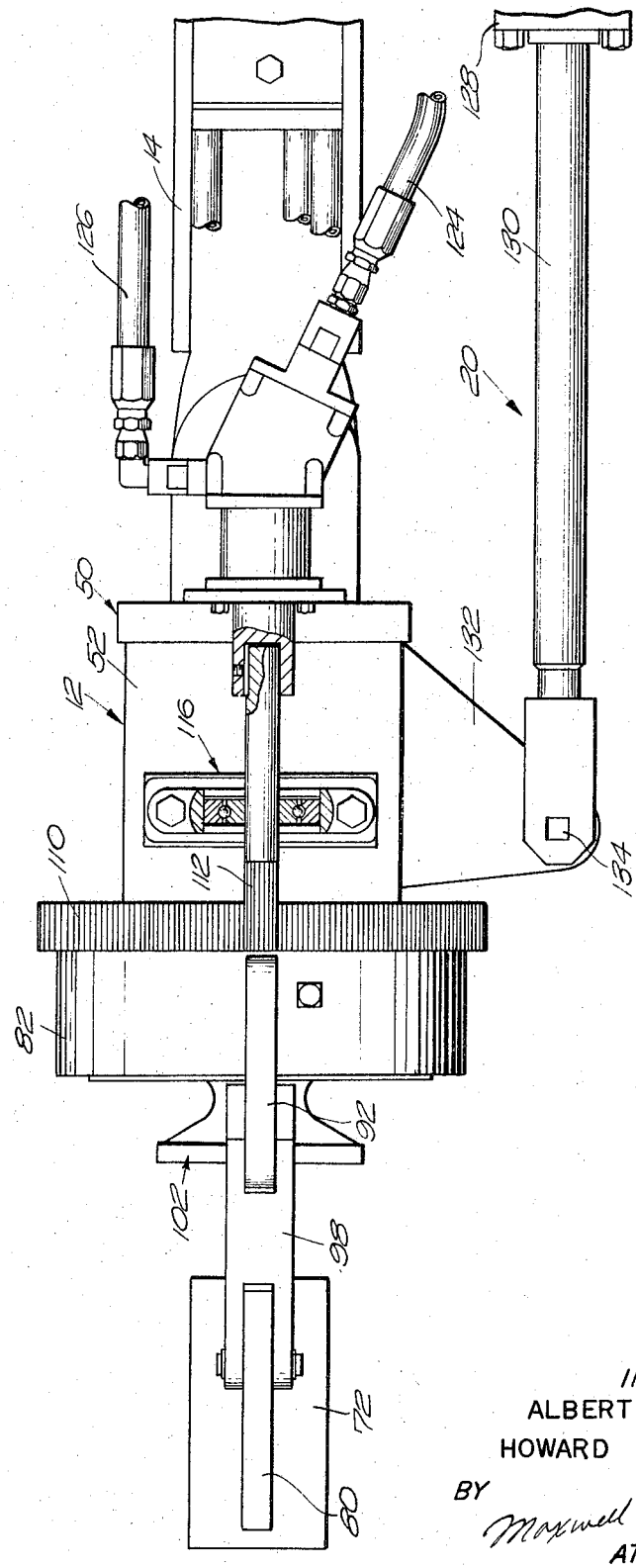
FIGURE 2 is a side elevational view on a plane which is substantially perpendicular to the view shown in FIGURE 1.
Figure 3:
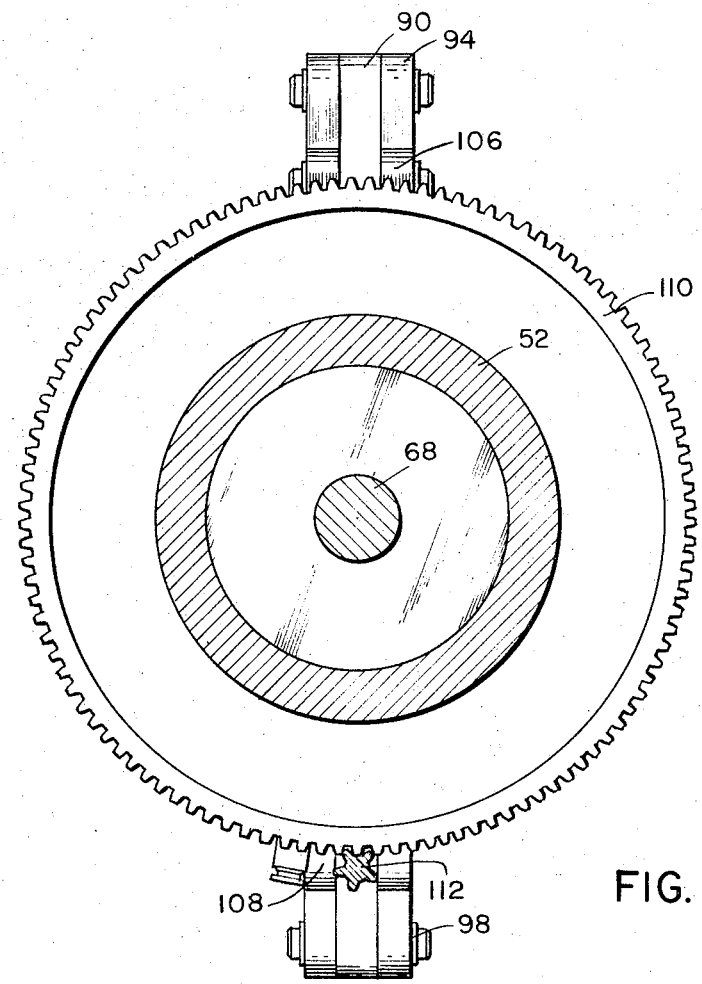
FIGURE 3 is a transverse sectional view taken substantially on the plane of line 3—3 in FIGURE 2.

Referring more particularly to the drawings wherein like numerals apply to like parts throughout, it will be seen that we have provided an improved underwater manipulator 10. The manipulator 10, as will be understood, can be coupled with a shoulder or other arm connection, not shown, which in turn can be connected to a selected underwater vehicle, not shown, such as are in use today in underwater research and salvage operations.

Suitable controls for the manipulator including valves, a hydraulic pressure source, piping, etc., obviously would be located in the vehicle and can be of varied design, the essentials of which will become apparent hereinafter.

The manipulator 10 includes a pair of arm sections 12, 14, a pair of jaws 16, 18, power means 20 for effecting relative pivoting movement between the arm sections, power means 22 for operating the jaws and power means 24 for rotating the jaws.

Arm 14 includes a rigid bar 26 with flexible hoses or piping at 28 held thereby by the hose covers 30, 32 secured by the bolt assembly 34. As will be understood hydraulic pressure and controls are in the vehicle (not shown) and these pipes are connected thereto. At the joint with arm section 22 the rigid bar 26 has an opening 36 through which the pivot wrist pin 38 extends.

The arm section 22 includes a pair of plates 40, 42 which receive the bar 26 therebetween. The pin 38 is engaged therethrough and is retained by the washers 44 and nuts 46. A grease fitting is provided at 48 for the pin for lubrication, as will be obvious.

The plates 40, 42 in turn are rigidly connected to the housing 50, as by weld or the like, which is of cylindrical form including the cylindrical casing 52 with end plates 54 and 56. End plate 54 is bolted or otherwise secured to the casing 52 and has a pressure connection at 58. The end plate 56 is internally engaged in the casing and provided with peripheral O-ring seals at 60. A retainer ring 62 threadedly received in the casing holds the end plate 56. The latter has an axial opening at 63 fitted with O-rings for a purpose to be described.

Another pressure connection is provided at 64 having communication with the end of casing 52 opposite from connection 58.

The power means 22 comprises a piston 66 received in casing 52 with a piston rod 68 connected thereto and projecting through opening 63. It will be obvious that the pressure connections 58 and 64 are connected to a pressure supply (not shown), preferably hydraulic, whereby the piston 66 can be moved in either direction.

The jaws 16 and 18 can be of any suitable design and as here shown include a pair of planar gripping plates 70, 72 having opposed parallel surfaces 74, 76. The plates have plates 78, 80 perpendicularly, rigidly connected thereto on their outsides.

The means for connecting the jaws to the arm sections and for operating the jaws will now be described. A cylindrical cover 82 is rotatably supported on the casing 52 by the pair of roller bearings 84, 86 which are held by retainer 88 threaded on casing 52. The cover 82 has a pair of diametrically opposed brackets 90, 92 connected thereto for rotation therewith. A pair of links 94 pivoted to the plate 78 and bracket 90 connects jaw 16 to cover 82. A second pair of links 96 parallel to links 94 similarly connect plate 78 with bracket 90.

Similarly, pairs of links 98, 100 connect plate 80 and bracket 92.

A yoke 102 of cylindrical form and having a peripheral indent 104 is positively secured to piston rod 68 for movement therewith. The links 96 and the links 100 have projecting portions as at 106, 108 forming bell cranks with their free ends engaged in the indent 104. It will be understood that operational movement of piston 66 will move yoke 102 which in turn will effect relative movement of jaws 16, 18 while retaining parallel disposition of surfaces 74, 76.

The means 24 whereby the jaws can be rotated includes a spur gear 110 encircling casing 52 and positively secured for rotation with cover 82, as by screws, bolts, or weld. A pinion gear 112 is formed on the end of shaft 114, the latter being journalled through the bearing assembly 116 which is mounted on casing 52. A hydraulic motor 118 such as readily available on the present market is supported by plate 120 which, in turn, is secured to end plate 54. Motor 118 has hydraulic connections 122, 124 and 126 for reversible operation of shaft 114. It will thus be seen that pinion 112 can drive spur 110 and thus cover 82 and the jaws 16, 18 supported thereby can be rotated in either direction through any degree of movement desired, including continuous rotation. It is to be noted that lever portions 106, 108 will ride in indent 104 during such rotation.

Figure 4:
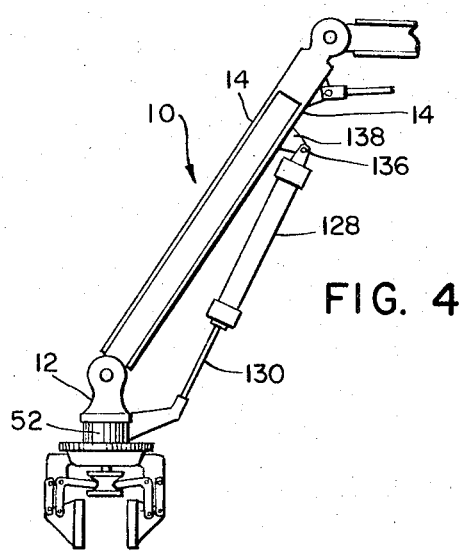
FIGURE 4 is a perspective view of the manipulator as in use.

The power means 20 which effect relative pivoting movement of the arm sections 12, 14 about wrist pin 38 includes a hydraulic cylinder 128 having a piston rod 130 reciprocable thereby. The rod 130 is pivotally connected to bracket 132 by bolt 134, the bracket being affixed to housing 52. Similarly as seen in FIGURE 4, the opposing end of cylinder 128 is pivotally connected by bolt 136 to bracket 138 secured to arm section 14. Hydraulic pressure connections (not shown) are provided at the opposite ends of cylinder 128, for operation thereof, as desired.

In view of the foregoing, it is believed that the construction and operation of the underwater manipulator of the present invention will be readily understood by one skilled in the art. It is also believed that we have provided an underwater manipulator which fulfills the objects hereinbefore enumerated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

We claim:

1. An underwater manipulator comprising an enclosed housing, a piston slidably carried in said housing and having a shaft extending out of said housing, means selectively propelling said piston and said shaft in either direction, a yoke carried by said shaft exteriorly of said housing, a cover rotatably carried about said housing, a pair of manipulator jaws, at least one pair of parallel arms pivotally joining at least one of said jaws to said cover, means operably coupling at least one arm of said one pair of parallel arms with said yoke whereby upon reciprocation of said yoke by said piston said jaws are parallelly moved relative to one another, and means selectively effecting rotation of said cover and jaws in either rotational direction through any degree of rotation.

2. An underwater manipulator comprising an enclosed housing, a piston slidably carried in said housing and having a shaft extending out of said housing, means selectively propelling said piston and said shaft in either direction, a yoke carried by said shaft exteriorly of said housing, a cover rotatably carried about said housing, a pair of manipulator jaws, at least one pair of parallel arms pivotally joining at least one of said jaws to said cover, means operably coupling at least one arm of said one pair of parallel arms with said yoke whereby upon reciprocation of said yoke by said piston said jaws are parallelly moved relative to one another, and means selectively effecting rotation of said cover and jaws in either rotational direction through any degree of rotation, said last recited means including a first gear concentric with said cover and fixed for rotation therewith, a second gear cooperative with said first gear, drive means connected with said second gear operable to drive said second gear in either rotational direction.

3. An underwater manipulator according to claim 2 wherein said drive means includes a hydraulic motor, and the axis of said second gear is offset and parallel to the axis of said first gear.

4. An underwater manipulator comprising an enclosed housing, a piston slidably carried in said housing and having a shaft extending out of said housing, means selectively propelling said piston and said shaft in either direction, said means including hydraulic pressure connections to said housing on opposite sides of said piston, a yoke carried by said shaft exteriorly of said housing, a cover rotatably carried about said housing, a pair of manipulator jaws, at least one pair of parallel arms pivotally joining at least one of said jaws to said cover, means operably coupling at least one arm of said one pair of parallel arms with said yoke whereby upon reciprocation of said yoke by said piston said jaws are parallelly moved relative to one another, and means selectively effecting rotation of said cover and jaws in either rotational direction through any degree of rotation, said last recited means including a hydraulic motor and gear train driven thereby connected with said cover.

5. An underwater manipulator comprising an enclosed housing, a piston slidably carried in said housing and having a shaft extending out of said housing, means selectively propelling said piston and said shaft in either direction, a yoke carried by said shaft exteriorly of said housing, a cover rotatably carried about said housing, a pair of manipulator jaws, at least one pair of parallel arms pivotally joining at least one of said jaws to said cover, means operably coupling at least one arm of said one pair of parallel arms with said yoke whereby upon reciprocation of said yoke by said piston said jaws are parallelly moved relative to one another, and means selectively effecting rotation of said cover and jaws in either rotational direction through any degree of rotation, said yoke comprising a generally cylindrical member having a peripheral indent.

6. An underwater manipulator comprising an enclosed housing, a piston slidably carried in said housing and having a shaft extending out of said housing, means selectively propelling said piston and said shaft in either direction, a yoke carried by said shaft exteriorly of said housing, a cover rotatably carried about said housing, a pair of manipulator jaws, at least one pair of parallel arms pivotally joining at least one of said jaws to said cover, means operably coupling at least one arm of said one pair of parallel arms with said yoke whereby upon reciprocation of said yoke by said piston said jaws are parallelly moved relative to one another, and means selectively effecting rotation of said cover and jaws in either rotational direction through any degree of rotation, said yoke comprising a generally cylindrical member having a peripheral indent, said means operably coupling at least one arm of said one pair of parallel arms including an angularly extending arm section integral with said at least one arm and engaged in said indent of said yoke.

7. An underwater manipulator comprising an enclosed housing, a piston slidably carried in said housing and having a shaft extending out of said housing, means selectively propelling said piston and said shaft in either direction, a yoke carried by said shaft exteriorly of said housing, a cover rotatably carried about said housing, a pair of manipulator jaws, at least one pair of parallel arms pivotally joining at least one of said jaws to said cover, means operably coupling at least one arm of said one pair of parallel arms with said yoke whereby upon reciprocation of said yoke by said piston said jaws are parallelly moved relative to one another, and means selectively effecting rotation of said cover and jaws in either rotational direction through any degree of rotation, an arm, said housing being connected to said arm by a pivot wrist, the axis of said pivot wrist being perpendicular to the plane of said jaws.

8. An underwater manipulator comprising an enclosed housing, a piston slidably carried in said housing and having a shaft extending out of said housing, means selectively propelling said piston and said shaft in either direction, a yoke carried by said shaft exteriorly of said housing, a cover rotatably carried about said housing, a pair of manipulator jaws, at least one pair of parallel arms pivotally joining at least one of said jaws to said cover, means operably coupling at least one arm of said one pair of parallel arms with said yoke whereby upon reciprocation of said yoke by said piston said jaws are parallelly moved relative to one another, and means selectively effecting rotation of said cover and jaws in either rotational direction through any degree of rotation, an arm, said housing being connected to said arm by a pivot wrist, the axis of said pivot wrist being perpendicular to the plane of said jaws, a power cylinder including a piston rod axially movably thereby in either axial direction, said cylinder and rod being positioned on an axis offset from the axes of said arm and said housing, means joining said cylinder and rod with said arm and housing whereby upon operation of said cylinder said housing pivots with respect to said arm.

References Cited by the Examiner

UNITED STATES PATENTS

| 569,939 | 10/1896 | Sawyer | 294—115 |
| 3,247,978 | 4/1966 | Neumeier | 214—1 |

GERALD M. FORLENZA, *Primary Examiner.*

G. F. ABRAHAM, *Assistant Examiner.*